United States Patent
Jasny et al.

(10) Patent No.: US 9,856,025 B2
(45) Date of Patent: Jan. 2, 2018

(54) AIRCRAFT SEAT CONFIGURATION AND ARRANGEMENT SYSTEMS AND METHODS

(71) Applicant: Zodiac Seats France, Issoudun (FR)

(72) Inventors: Franck Jasny, Venesmes (FR); Christophe Ducreux, Issoudun (FR); Jeremy Cailleteau, Saint Aout (FR); Philippe Roy, Diou (FR); Patrick Herault, Saint Hilaire En Lignieres (FR)

(73) Assignee: Zodiac Seats France, Issoudun (FR)

( * ) Notice: Subject to any disclaimer, the term of this patent is extended or adjusted under 35 U.S.C. 154(b) by 0 days.

(21) Appl. No.: 14/437,509

(22) PCT Filed: Oct. 28, 2013

(86) PCT No.: PCT/IB2013/002630
§ 371 (c)(1),
(2) Date: Apr. 22, 2015

(87) PCT Pub. No.: WO2014/064525
PCT Pub. Date: May 1, 2014

(65) Prior Publication Data
US 2015/0298812 A1  Oct. 22, 2015

Related U.S. Application Data

(60) Provisional application No. 61/719,053, filed on Oct. 26, 2012, provisional application No. 61/811,141, filed on Apr. 12, 2013.

(30) Foreign Application Priority Data

Apr. 12, 2013  (FR) ...................................... 13 53338

(51) Int. Cl.
*B64D 13/00*  (2006.01)
*B64D 11/06*  (2006.01)
(Continued)

(52) U.S. Cl.
CPC ............ *B64D 11/064* (2014.12); *B60N 2/002* (2013.01); *B60N 2/005* (2013.01); *B60N 2/01* (2013.01);
(Continued)

(58) Field of Classification Search
CPC ........ B60N 2/002; B60N 2/345; B60N 2/005; B60N 2/01; B60N 2/22; B60N 2/242;
(Continued)

(56) References Cited

U.S. PATENT DOCUMENTS 2,632,408 A * 3/1953 Giles ........................ B61D 1/04
105/344
2001/0000639 A1 * 5/2001 Park ...................... A47C 1/0352
297/411.3
(Continued)

FOREIGN PATENT DOCUMENTS

EP  1707486 A1  10/2006
EP  2154067 A2  2/2010
(Continued)

OTHER PUBLICATIONS

French Patent Application No. 13/53338, Notice of Grant (allowance) dated Jan. 27, 2016, 1 page.
(Continued)

*Primary Examiner* — Assres H Woldemaryam
(74) *Attorney, Agent, or Firm* — Kilpatrick Townsend & Stockton LLP; Dean W. Russell; Davidson G. Lucas

(57) ABSTRACT

The present invention generally relates to passenger aircraft seats. The disclosure focuses on a seat unit arrangement (10) for a cabin and seat units that provide different comfort positions. In some embodiments, a side cushion (14) forms part of a bed surface when the seats are converted to a bed position. In some embodiments, a bed extension (30) is deployed from a stowed position to form a part of the bed (Continued)

surface. In some embodiments, a seat backrest (22) does not form part of the bed surface when the seat unit is in the bed position. In some embodiments, a lounge position is provided when the seat backrest rotates toward a side cushion. In such an embodiment, the passenger may be positioned toward the side cushion such that the passenger may comfortably rest their legs on the side cushion without converting the seat to a bed position.

8 Claims, 14 Drawing Sheets

(51) Int. Cl.
*B60N 2/00* (2006.01)
*B60N 2/34* (2006.01)
*B60N 2/005* (2006.01)
*B60N 2/01* (2006.01)
*B60N 2/22* (2006.01)
*B60N 2/24* (2006.01)
*B60N 2/44* (2006.01)

(52) U.S. Cl.
CPC .............. *B60N 2/22* (2013.01); *B60N 2/242* (2013.01); *B60N 2/34* (2013.01); *B60N 2/345* (2013.01); *B60N 2/441* (2013.01); *B60N 2/4495* (2013.01); *B64D 11/06* (2013.01); *B64D 11/0601* (2014.12); *B64D 11/0604* (2014.12); *B64D 11/0606* (2014.12); *B64D 11/0641* (2014.12); *B64D 11/0642* (2014.12); *B64D 11/0643* (2014.12); *B64D 11/0647* (2014.12)

(58) Field of Classification Search
CPC ...... B60N 2/441; B60N 2/34; B64D 11/0606; B64D 11/06; B64D 11/064; B64D 11/0642; B64D 11/0643; B64D 11/0647
See application file for complete search history.

(56) References Cited

U.S. PATENT DOCUMENTS

| | | | | |
|---|---|---|---|---|
| 2006/0219843 | A1* | 10/2006 | Martin | B60N 2/34 244/118.6 |
| 2009/0146005 | A1* | 6/2009 | Bettell | B64D 11/00 244/118.6 |
| 2009/0146006 | A1* | 6/2009 | Park | B60N 2/345 244/118.6 |
| 2010/0065683 | A1* | 3/2010 | Darbyshire | B64D 11/06 244/118.6 |
| 2010/0308164 | A1* | 12/2010 | McKeever | B64D 11/06 244/118.6 |
| 2011/0282495 | A1* | 11/2011 | Fischer | B60N 2/0224 700/275 |
| 2012/0292957 | A1* | 11/2012 | Vergnaud | B64D 11/06 297/188.08 |

FOREIGN PATENT DOCUMENTS

| | | | |
|---|---|---|---|
| EP | 3127811 A1 | * | 2/2017 |
| FR | 2842498 A1 | | 1/2004 |
| GB | 2438162 A | * | 11/2007 |
| GB | 2449401 A | * | 11/2008 |
| WO | 2003013903 A1 | | 2/2003 |
| WO | 2007072045 A2 | | 6/2007 |

OTHER PUBLICATIONS

International Patent Application No. PCT/IB2013/002630, Invitation to Pay Additional Fees and, Where Applicable, Protest Fee and Partial Search Report dated Jan. 29, 2014.
International Patent Application No. PCT/IB2013/002630, Search Report and Written Opinion dated Jul. 30, 2014.
International Patent Application No. PCT/IB2013/002630, International Preliminary Report on Patentability dated May 7, 2015.

* cited by examiner

AIRCRAFT SEAT CONFIGURATION AND ARRANGEMENT SYSTEMS AND METHODS

CROSS REFERENCES TO RELATED APPLICATIONS

This application is the U.S. national phase entry of International Application No. PCT/IB2013/002630, filed Oct. 28, 2013, which application claims priority to and the benefit of U.S. Provisional Application No. 61/719,053, filed on Oct. 26, 2012, U.S. Provisional Application No. 61/811,141, filed on Apr. 12, 2013, and French Application No, FR13/53338 flied on Apr. 12, 2013, the entire contents of each of which arc incorporated herein by reference.

BACKGROUND OF THE INVENTION

The present invention generally relates to passenger seats. More specifically, embodiments of the present invention relate to systems and methods for configuring aircraft seats and arranging aircraft seats in a passenger cabin.

Usually, aircraft passenger seats are provided with a backrest that may rotate up and down around an axis perpendicular to the axis of the passenger seat. Using such a mechanism, some aircraft passenger seats may have a number of different seat positions. For example, some seats provide a fully flat/horizontal in flight bed position in addition to an upright seating position. In such designs, the bed may be defined by the seat backrest cushion and the pan cushion. Some designs also provide various intermediate positions between the upright seated position and the bed position. For example, some intermediate positions, such as a relaxed or snooze position, may be defined by a significant recline of the seat backrest. In some seat configurations that may transition to a bed position, a passenger must first vacate the seat before being able to transform the seat into the bed position.

While the prior designs may provide various seat positions, further improvements can be made. It may be desirable to provide improved systems and methods for configuring a passenger seat so as to provide a new comfort position. Additionally, a passenger seat may be improved so as to allow a passenger to remain seated as the passenger seat is converted from the upright seated position to a horizontal bed position. Moreover, it may be desirable to provide improved systems and methods for configuring a passenger seat which provides a wider horizontal bed position. Further, it may be desirable to provide a new seat arrangement that allows passenger egress without disturbing other passengers, even when the seats of the other passengers are in a reclined or horizontal bed position.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some embodiments, a seat unit is provided including a moving seat and a seat shell. The seat may be moved from an upright position to a bed position. In some embodiments, the seat axis may be different than the bed axis. In some embodiments the backrest may be used as a portion of the bed surface. Optionally, the seat pan may overlap with the backrest of the seat unit in front. For example, in some embodiments the seat pan may project into a seat backrest recess of the seat unit in front of the seat pan. Optionally, a portion of the seat pan may be retractable so as to reduce its length when transitioning between the upright position and the bed position. For example, in some embodiments, the front part of a seat pan may be retractable to accommodate available space. In some cases, the seat pan may overlap with the backrest of the seat unit in front and may include a retractable portion so as to reduce its length when transitioning between the upright position and the bed position.

In some embodiments, a passenger seat arrangement is provided. The passenger seat may provide a plurality of different positions. The plurality of different positions may include a bed position and an upright position. The bed position may provide a bed surface being formed at least by a seat pan and one or more bed extensions. The one or more bed extensions may not form part of a seat surface or a footrest when the passenger seat is in the upright position. In some embodiments, the passenger seat may include a seat backrest and the seat backrest does not form part of the bed surface when the passenger seat is in the bed position.

Optionally, the passenger seat comprises a seat backrest, and a bottom portion of the seat backrest may include a headrest cushion. The headrest cushion may be moveable to a deployed position to provide a headrest when the passenger seat is in the bed position. Additionally, the headrest cushion may be moveable to a stowed position when the passenger seat is in another position.

In some embodiments, the bed extension may be stored under a seat pan. The passenger seat may further include a footrest and a seat mechanism for deploying the footrest and the bed extension in order to convert the passenger seat to the bed position.

In additional embodiments, a side cushion may be positioned laterally and forward of the passenger seat. The passenger seat backrest may be rotatable towards the side cushion so as to provide a lounge position. The bed surface may comprise the seat pan cushion, the one or more bed extensions, and the side cushion. Optionally, the passenger seat may include a sensor for detecting the presence of a passenger to avoid conversion of the seat from the bed position to the upright position when a passenger is not seated properly.

In some embodiments, the arrangement may include a plurality of passenger seats oriented substantially in an axis of a cabin. The seats may be arranged such that the seats have a herringbone bed arrangement.

In another aspect of the invention, a passenger seat arrangement is provided. The passenger seat arrangement may include a passenger seat comprising a seat backrest and a seat pan. The passenger seat arrangement may further include a side cushion positioned laterally and forward of the passenger seat. The seat backrest may be rotatable between a forward facing position and a second position. The second position may face toward the side cushion. In some embodiments the seat backrest may rotate relative to the seat pan when the seat backrest rotates between the forward facing position and the second position. In other embodiments, the seat backrest and the seat pan may rotate together when the seat backrest rotates between the forward facing position and the second position.

Optionally, the seat backrest may comprise a lower backrest and an upper backrest. The lower backrest may be rotatable between the forward facing position and the second position separately from the upper backrest. The lower backrest may be coupled with the seat pan and the upper backrest may be coupled with a privacy shell. In some embodiments, the upper backrest may be rotatable relative to the privacy shell.

In some embodiments, the passenger seat may be moveable between an upright position and a bed position. The bed position may provide a substantially horizontal bed surface. The bed surface may include a bed extension and the bed extension may not form part of a seat surface or a footrest when the seat is in the upright position. Optionally, the seat backrest may not form part of the bed surface. Optionally, a lower portion of the seat backrest forms a part of the bed surface while an upper portion of the seat backrest does not form part of the bed surface.

In yet another embodiment of the invention, a passenger seat arrangement for a cabin is provided. The cabin may be defined by cabin walls. The passenger seat arrangement may include a column of seat units adjacent to a cabin wall. The seat units may comprise a passenger seat and a side cushion positioned laterally and forward of the passenger seat. The side cushion and the passenger seat may define a footwell forward of the passenger seat. And the side cushions may be positioned lateral of the passenger seat on a side toward the cabin wall.

A second column of seat units may be separated from the other column of seat units by an aisle. The seat units of the second column may also comprise a passenger seat and a side cushion positioned laterally and forward of the passenger seat and the side cushion and the passenger seat may define a footwell forward of the passenger seat. The seat unit footwells of the first column and the seat unit footwells of the second column may be accessible from the aisle. Optionally, at least one of the seat units is moveable from an upright position to a bed position or a lounge position. If the at least one seat unit is moveable to a bed position, the bed position may provide a substantially horizontal bed surface comprising at least the side cushion and the seat pan. If the at least one seat unit is moveable to the lounge position, the lounge position provides a seat backrest rotatable from a forward facing position to a second position. The second position facing toward the side cushion such that a passenger may comfortably rest their legs on the side cushion when seated in the passenger seat.

The invention will be better understood on reading the following description and examining the figures that accompany it. These figures are provided by way of illustration only and are in no way limiting on the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
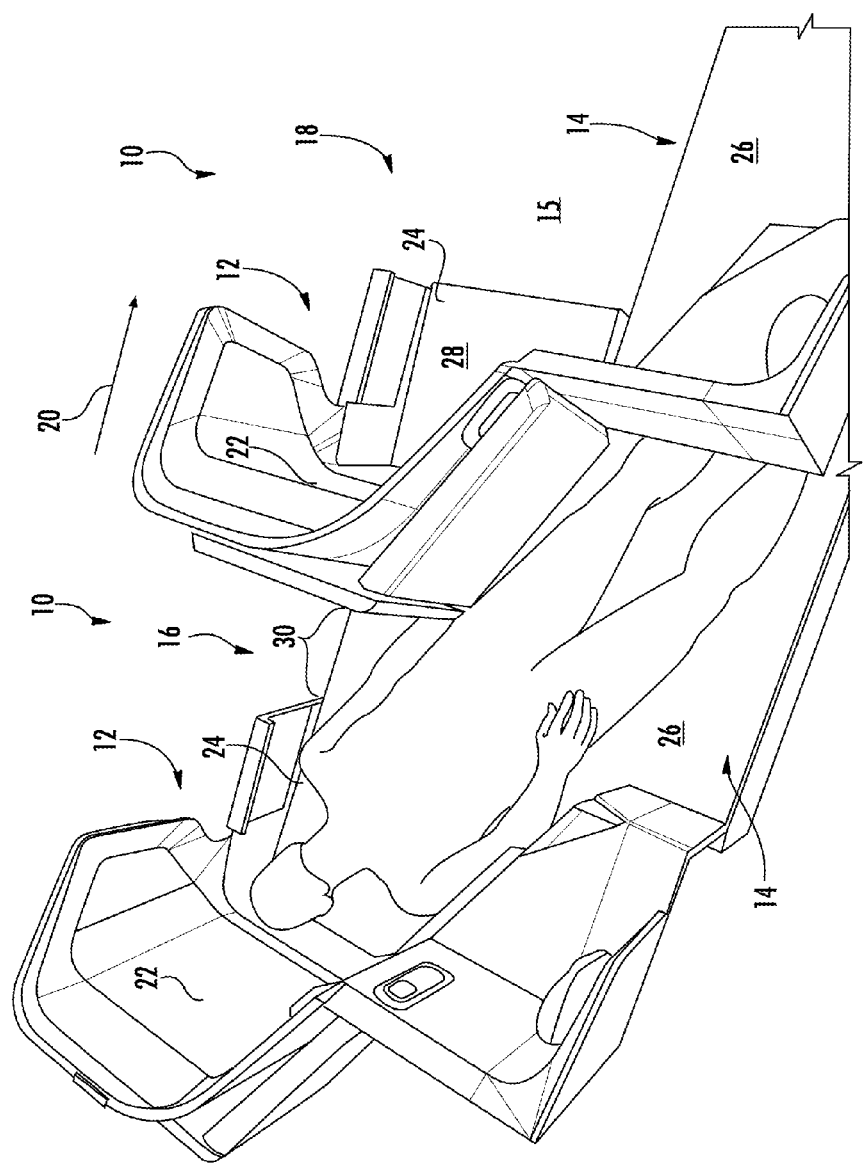
FIG. 1 illustrates exemplary embodiments of the present invention.

FIG. 1 illustrates exemplary seat units 10 in various configurations according to some embodiments of the present invention. The seat unit 10 may comprise a seat 12 and a side cushion 14 and may be convertible between a bed position 16 and a upright position 18. In the bed position 16, the passenger may lie in a substantially horizontal position. In the upright position 18, the seat unit 10 may include a footwell 15 such that the passenger may be seated upright, generally in a forward facing direction 20.

The seat 12 may comprise a seat backrest 22 and seat pan 24. Side cushion 14 may be substantially horizontal to provide a resting surface 26 and may extend laterally and forward from seat pan 24. Seat pan 24 may be configured or reconfigured such that a top surface 28 of seat pan 24 is substantially flush and horizontal with resting surface 26.

To convert seat unit 10 from the upright position 18 to the bed position 16, a portion 30 of seat 12 may be moved to a horizontal position lateral to side cushion 14 and in direction 20 so as to form a part of the bed surface that extends over footwell 15. In some embodiments, portion 30 of seat 12 may be a part of the backrest cushion 22, the seat pan 24, a bed extension, and/or a footrest. In some embodiments, such as the exemplary embodiments illustrated in FIGS. 2A-2D and discussed in more detail below, portion 30 may comprise a bed extension and a footrest. Accordingly, the bed surface may comprise side surface 14 in addition to a part of the backrest cushion 22, the seat pan 24, a bed extension, and/or a footrest. For example, in some embodiments a backrest cushion 22 may have an upper portion and a lower portion. The lower portion may form a bed surface with side surface 14, seat pan 24, a bed extension, and/or a footrest while the upper portion does not form a part of the bed surface. In other embodiments, such as the embodiment in FIGS. 2A-2D, the bed surface does not include a part of the backrest cushion 22 but comprises side surface 14 in addition to seat pan 24, a bed extension, and/or a footrest. In other embodiments, such as the ones illustrated in FIG. 5 and FIG. 6, seat backrest cushion, seat pan, and side cushion may form the bed surface.

Figure 2A:
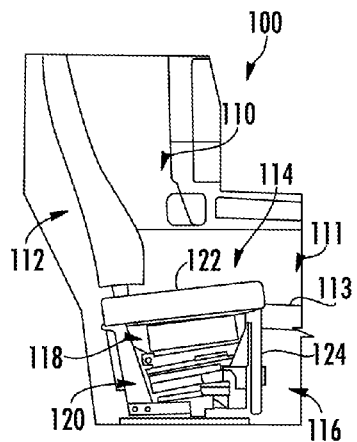
FIGS. 2A-2D illustrate exemplary embodiments of a seat unit and the exemplary conversion of a passenger seat when the seat unit is converted from an upright position to a bed position according to some embodiments of the invention.
Figure 2B:
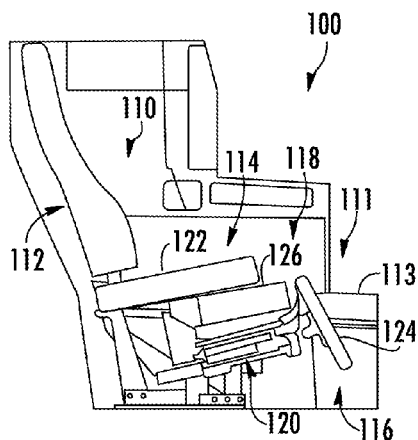
Figure 2C:
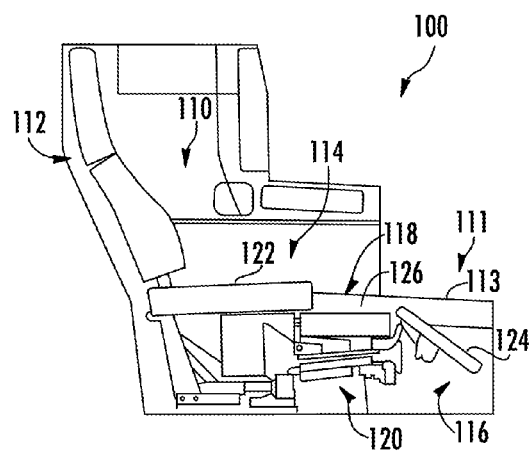

FIGS. 2A-2D illustrate exemplary embodiments of a seat unit 100 and the exemplary conversion of a passenger seat 110 when seat unit 100 is converted from an upright position to a bed position according to some embodiments of the invention. Similar to the embodiments illustrated in FIG. 1, seat unit 100 may include passenger seat 110 and a side cushion 111. Side cushion 111 may provide a substantially horizontal resting surface 113 adjacent to and extending forward from passenger seat 110. The configuration of passenger seat 110 in FIG. 2A may define an upright position of passenger seat 110 and the configuration of passenger seat 110 in FIG. 2D may define a bed position of passenger seat 110. FIGS. 2B and 2C may illustrate the transition of passenger seat 110 from the upright position to the bed position.

As illustrated in FIGS. 2A-2D, passenger seat 110 may include a seat backrest 112, a seat pan 114, and/or a footrest 116. Passenger seat 110 may further include a bed extension 118 that may be stored under a seat pan 114 or behind footrest 116 when the passenger seat 110 is in the upright position. A seat mechanism 120 may be provided for coupling with the seat pan 114, the footrest 116, and the bed extension 118. The seat mechanism 120 may control the position and/or orientation of seat pan 114, footrest 116, and bed extension 118 as passenger seat 110 is repositioned between the upright position and the bed position. Details of the operation of seat mechanism 120 may be greater appreciated in FIGS. 2B-2D.

Figure 2D:
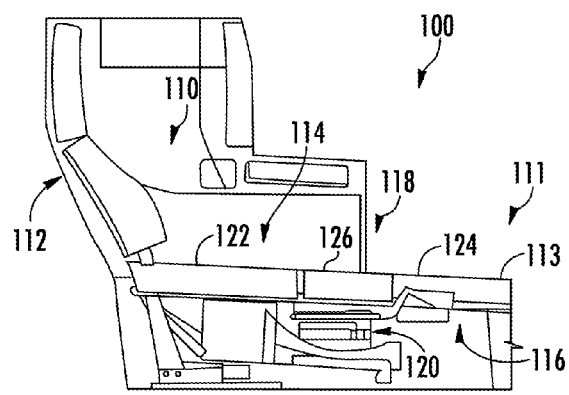

As illustrated in FIGS. 2B-2D, seat mechanism 120 may move seat pan 114 from a first position when the passenger seat 110 is in the upright position to a second position when the passenger seat 110 is in the bed position. As illustrated in FIG. 2A, when seat pan 114 is in the first position (i.e., when the passenger seat 110 is in the upright position), a top surface 122 of seat pan 114 may be at a slight angle relative to a horizontal plane. FIG. 2D shows how seat mechanism 120 may rotate and/or translate seat pan 114 such that the top surface 122 of seat pan 114 is substantially horizontal when moved to the second position (i.e., when the passenger seat 110 is in the bed position). Preferably, top surface 122 of seat pan 114 is adjacent to, flush, and/or level with resting surface 113 of side cushion 111 when seat pan 114 is in the second position.

Further, seat mechanism 120 may move footrest 116 from a first position when the passenger seat 110 is in the upright position to a second position when the passenger seat 110 is in the bed position. As illustrated in FIG. 2A, when footrest 116 is in the first position, a resting surface 124 of footrest 116 may be in a substantially vertical position. FIG. 2D shows how seat mechanism 120 may rotate and translate footrest 116 such that the resting surface 124 of footrest 116 is substantially horizontal when moved to the second position (i.e., when the passenger seat 110 is in the bed position). Preferably, resting surface 124 of footrest 116 is adjacent to, flush, and/or level with resting surface 113 of side cushion 111 when footrest 116 is in the second position.

Seat mechanism 120 may also move bed extension 118 from the stored position when the passenger seat 110 is in the upright position to a deployed position when the passenger seat 110 is in the bed position. As discussed above and as illustrated in FIG. 2A, when passenger seat 110 is in the upright position, bed extension 118 may be in the stored position and may be substantially concealed by seat pan 114 and footrest 116. As passenger seat 110 transitions from the upright position to the bed position, seat mechanism 120 may rotate and/or translate bed extension 118 from the stored position to the deployed position where a top surface 126 of bed extension 118 is substantially horizontal. Preferably, top surface 126 of bed extension 118 is adjacent to, flush, and/or level with resting surface 113 of side cushion 111 when bed extension 118 is in the deployed position.

As shown in FIGS. 2A-2D, seat mechanism 120 may project footrest 116 forward a distance so as to allow bed extension 118 to fit between seat pan 114 and footrest 116 when the passenger seat 110 is transitioned from the upright position to the bed position. Accordingly, seat mechanism 120 may move seat pan 114, bed extension 118, and footrest 116 adjacent to one another such that the surfaces 122, 124, 126 of each component are substantially flush and horizontal so as to form a bed surface with surface 113 of side cushion 111.

Further while passenger seat 110 has been illustrated with one bed extension 118, other embodiments may use more than one bed extension 118. Additionally, FIGS. 2A-2D show embodiments where seat mechanism 120 automatically transitions seat pan 114, footrest 116, and bed extension 118 in unison as the passenger seat 110 is transitioned between the upright position and the bed position. In other embodiments, bed extension 118 may not be coupled with the seat mechanism 120. For example, in some embodiments, bed extension 118 may be manually positioned and/or removed after seat mechanism 120 has repositioned seat pan 114 and footrest 116. Moreover, seat mechanism 120 may be manually driven or driven by an electric actuator. While FIGS. 2A-2D illustrate a seat mechanism 120 that positions bed extension 118 between seat pan 114 and footrest 116, other seat mechanism configurations are possible that may provide alternative arrangements of the components when passenger seat 110 is converted to the bed position. Advantageously, the additional side cushion 111 may provide a wider bed surface when seat 110 is in the bed position.

Figure 3:
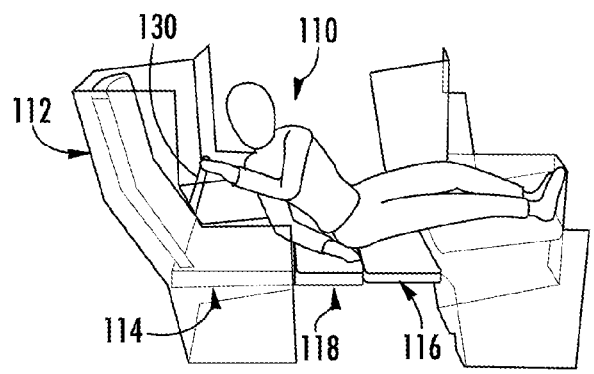
FIG. 3 illustrates an exemplary backrest of a passenger seat according to some embodiments of the present invention.

In the illustrated embodiment, seat backrest 112 may not be needed to form part of the bed surface. Optionally, in some embodiments, such as the embodiment illustrated in FIG. 3, a bottom portion of seat backrest 112 may comprise a deployable headrest 130. The deployable headrest 130 may be moveable between a stowed position and a deployed position. When in the stowed position, the deployable headrest 130 may form part of the bottom portion of the seat backrest 112. When deployed, the deployable headrest 130 may provide a headrest for supporting a passenger's head when the passenger seat is in the bed position. In some embodiments, a pull tab may couple with an end of the headrest 130 to facilitate manual deployment of the headrest 130 to the deployed position. Optionally, headrest 130 may be moved between the deployed and the stowed position using an electric actuator.

Figure 4A:
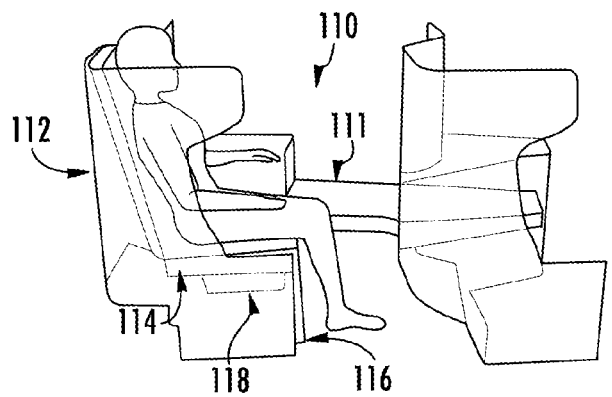
FIGS. 4A-4D illustrate exemplary embodiments of a seat unit that may move a seated passenger's body so that the passenger may remain seated on the seat as the seat transitions between a first position and a bed position according to some embodiments of the invention.
Figure 4B:
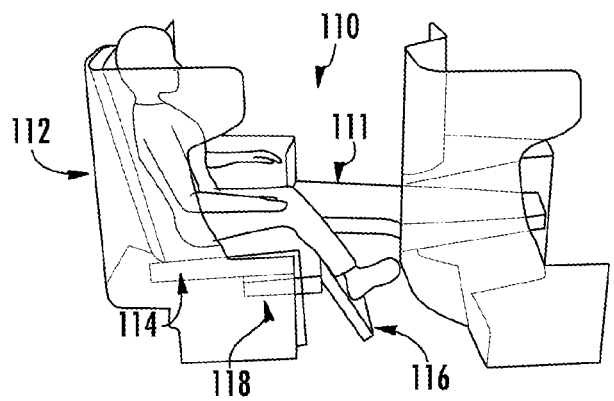
Figure 4C:
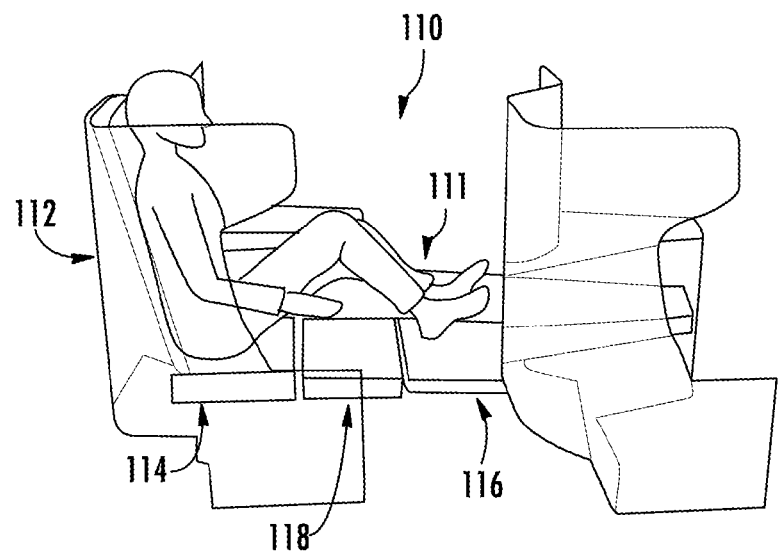
Figure 4D:
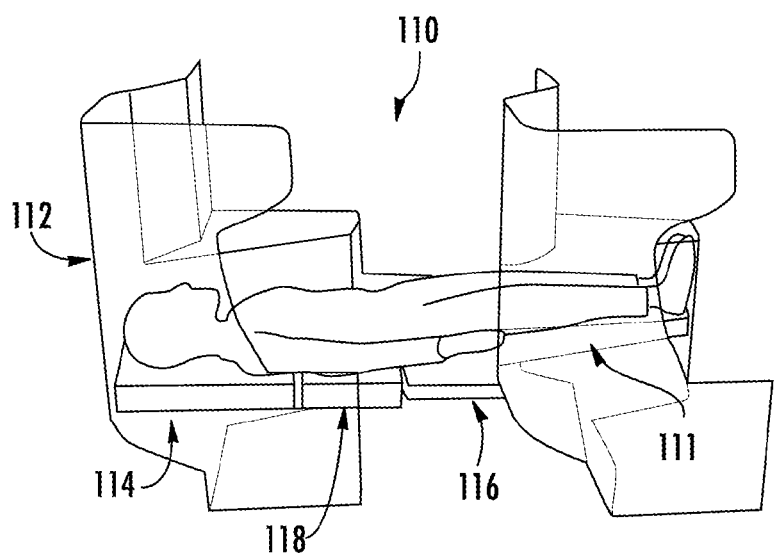

In some embodiments, a seat unit may move a seated passenger's body so that the passenger may remain seated on the seat as the seat transitions between a first position and a bed position as shown in FIGS. 4A-4D. FIG. 4A illustrates a passenger seated in passenger seat 110 when passenger seat 110 is in an upright position. FIG. 4B illustrates an intermediate position of passenger seat 110 as passenger seat 110 moves toward the bed position. Footrest 116 may rotate and project forward toward the bed position so as to raise the seated passenger's legs and to allow bed extension 118 to move from the stowed position toward the bed position. FIG. 4C illustrates passenger seat 110 in the bed position with the passenger seated. Once in the bed position, the passenger may reposition himself/herself from the seated position to a lying position across the bed surface comprising the seat pan 114, bed extension 118, footrest 116 and side cushion 111. In some embodiments, the seat unit may include a sensor to prevent the seat unit from returning to the upright position from the bed position when the passenger is in a lying position across the bed surface. For example, passenger seat 110 may include a pressure sensor to detect the presence of a lying passenger. When the passenger is lying, the sensor may prevent passenger seat 110 from returning to an upright position. In some embodiments, the passenger seat 110 may wait till the passenger is properly seated or vacant from the seat before transitioning from the bed position back to the upright position.

Figure 5A:
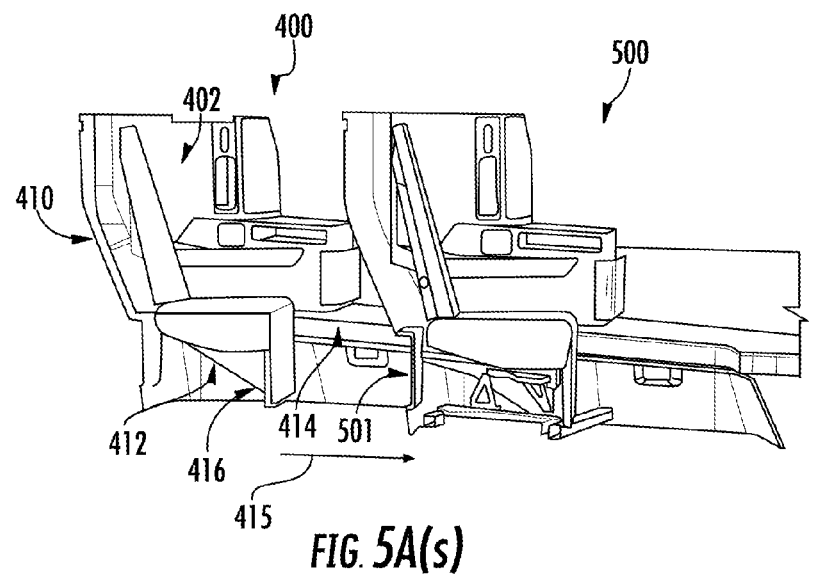
FIGS. 5A-5C illustrate exemplary embodiments of a seat kinematic according to certain aspects of the invention.
Figure 5A:
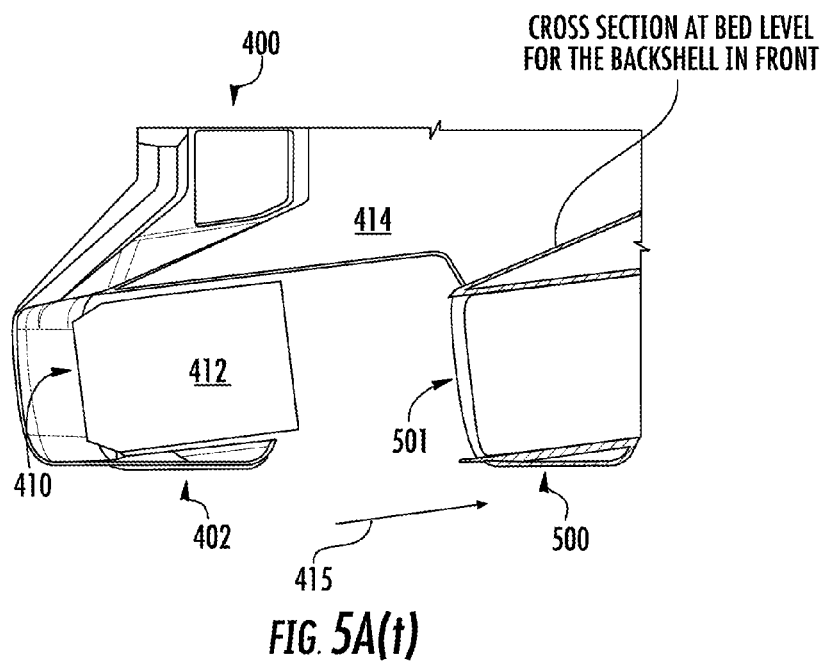
Figure 5B:
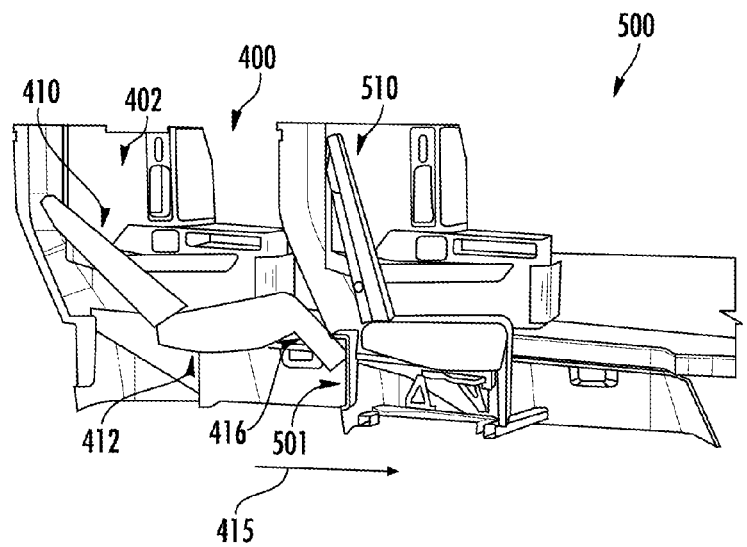
Figure 5B:
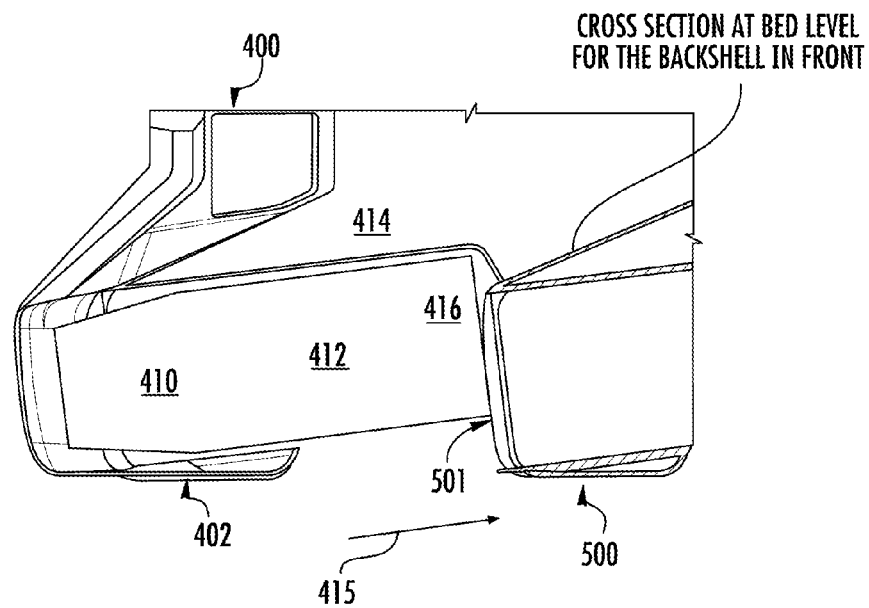
Figure 5C:
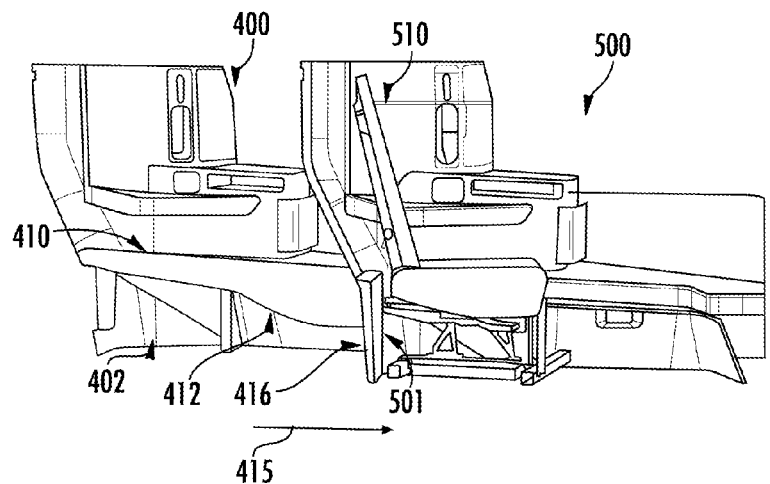
Figure 5C:
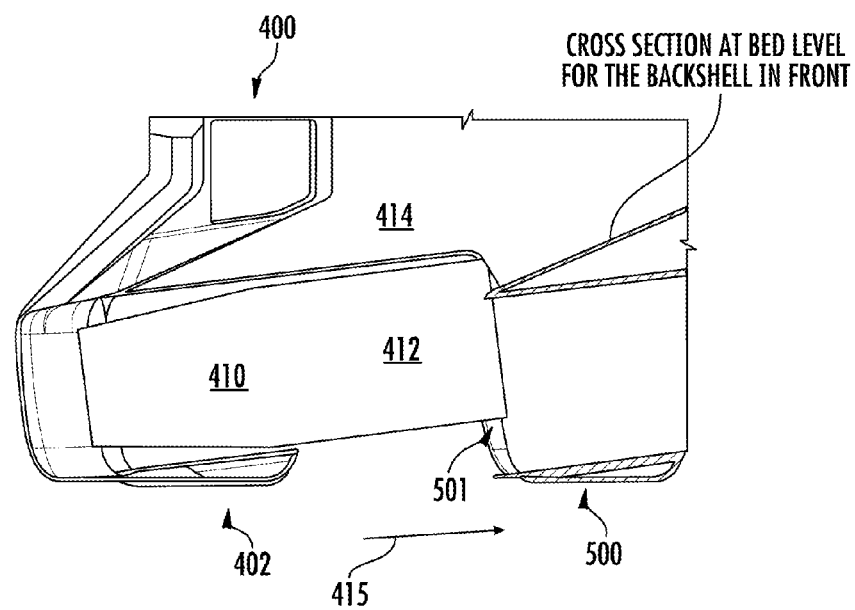

FIGS. 5A-5C illustrate an exemplary embodiment of a seat unit 400 including a passenger seat 402, where the bed surface is formed by a seat backrest 410, a seat pan 412, and a side cushion 414. FIG. 5A(s)-5A(t) illustrate the side and top views of seat unit 400 when the passenger seat 402 is in the upright position. FIG. 5C(s)-5C(t) illustrate the side and top views of seat unit 400 when the passenger seat 402 is in the bed position. FIG. 5B illustrate the side and top views of seat unit 400 as the passenger seat 402 is moved between the upright position and the bed position.

Optionally, passenger seat 402 may include a foot rest 416. In some embodiments, pitch between seat unit 400 and seat unit 500 may be fixed or limited. As illustrated in FIGS. 5A-5C ((s) and (t) views), seat backrest 410 may recline from the upright position to a substantially horizontal position flush with side cushion 414. In order to accommodate the length of seat backrest 410 and the movement of seat backrest 410 to the horizontal position, seat pan 412 may be projected in a forward direction 415 from the upright position toward the bed position. In some embodiments, seat pan 412 may extend into a recess 501 of the seat unit 500 in front of seat unit 400. Recess 501 may also be configured to accommodate footrest 416. Accordingly, in some embodiments, seat pan 412 may overlap with the seat backrest 510 of the seat unit 500. As illustrated in FIG. 5C ((s) and (t) views), once in the bed position, seat backrest 410, seat pan 412, and side cushion 414 may provide a bed surface.

Figure 6A:
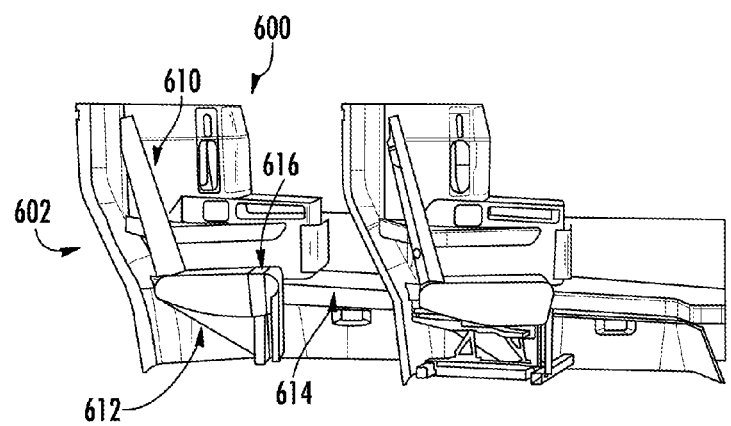
FIGS. 6A-6D illustrate exemplary embodiments of yet another seat kinematic according to certain aspects of the invention.
Figure 6A:
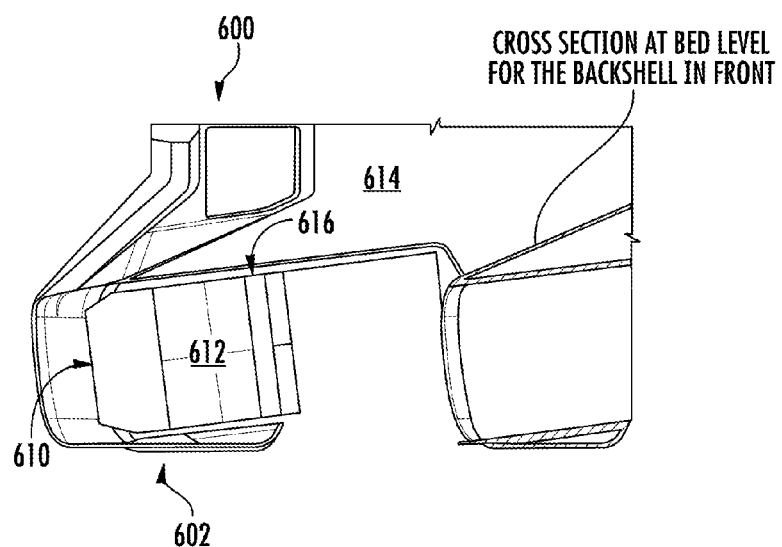
Figure 6B:
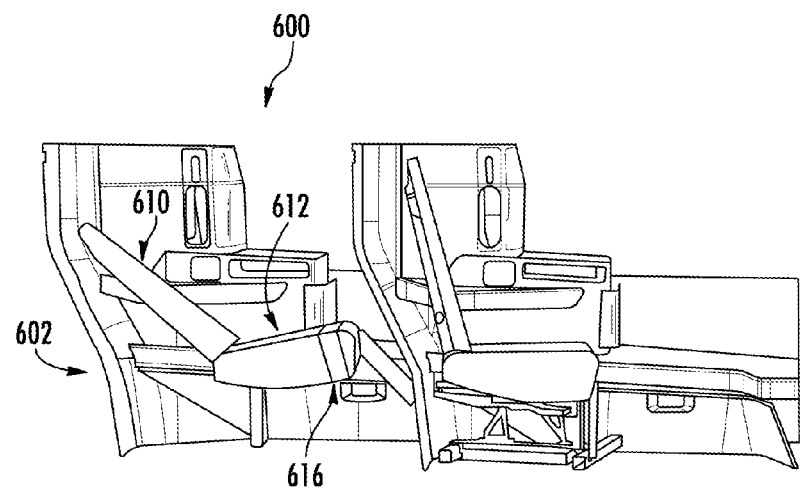
Figure 6B:
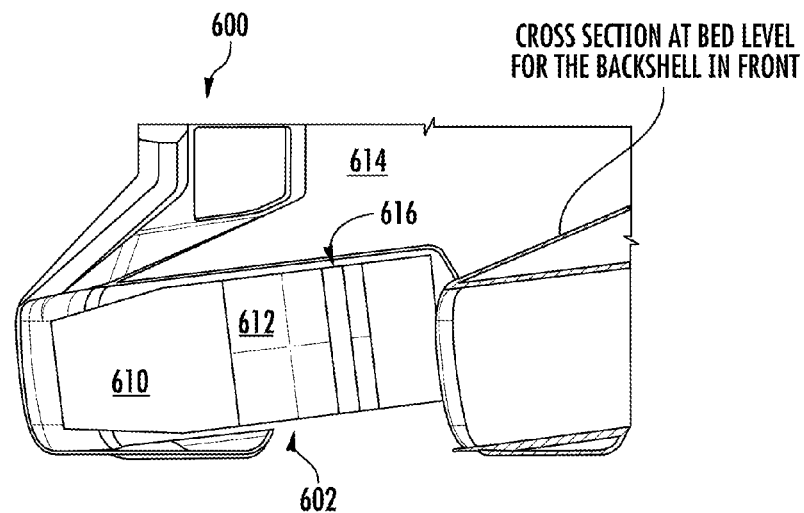
Figure 6C:
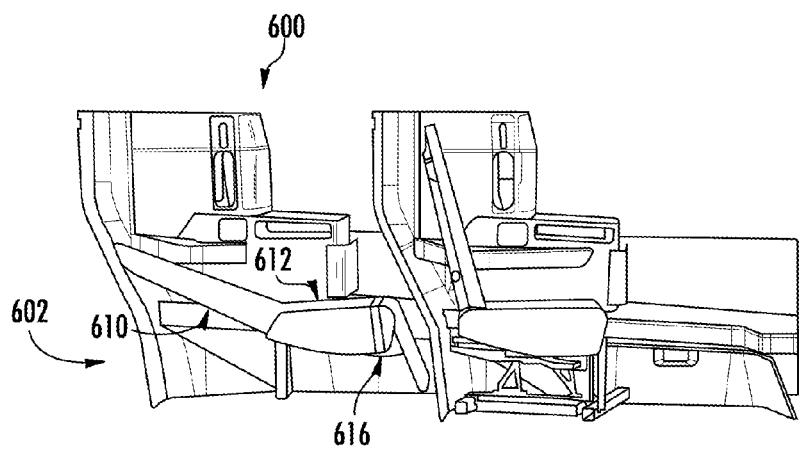
Figure 6C:
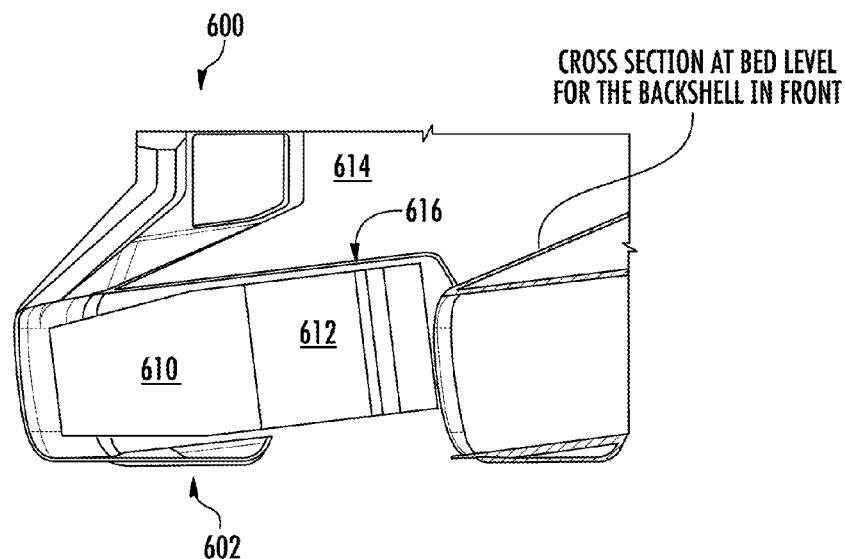
Figure 6D:
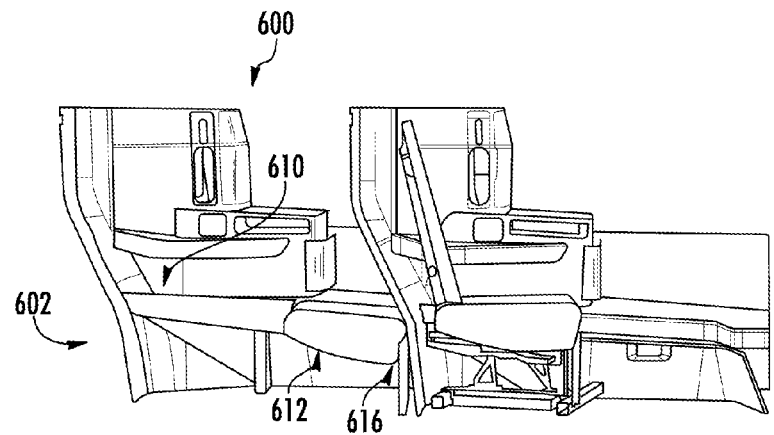
Figure 6D:
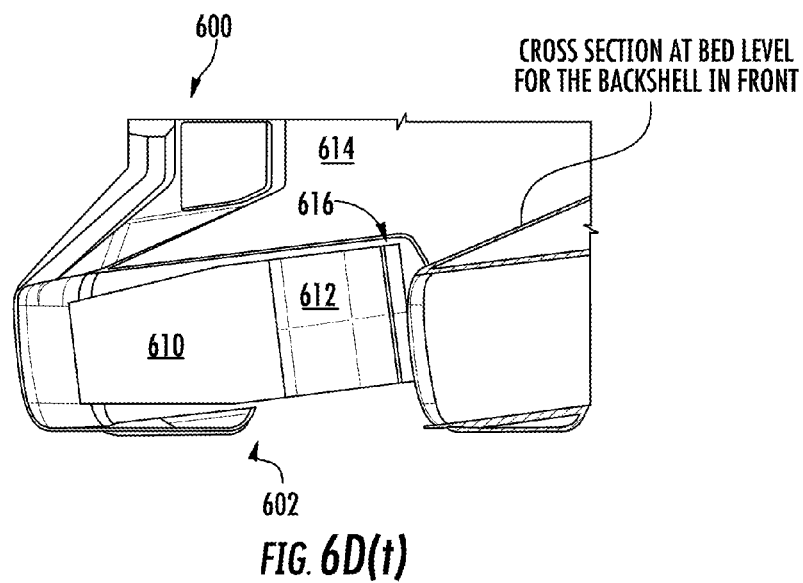

FIGS. 6A-6D ((s) and (t) views) illustrate an exemplary embodiment of a seat unit 600 including a passenger seat 602, where the bed surface is formed by seat backrest 610, seat pan 612, and side cushion 614. FIGS. 6A(s)-6A(t) illustrate the side and top views of seat unit 600 when the passenger seat 602 is in the upright position. FIG. 6D(s)-6D(t) illustrate the side and top views of seat unit 600 when the passenger seat 602 is in the bed position. FIGS. 6B-6C ((s) and (t) views) illustrate the side and top views of seat unit 600 as the passenger seat 602 is moved between the upright position and the bed position.

Seat pan 612 of passenger seat 602 may include a retractable portion 616. Retractable portion 616 may retract so as to shorten a length of seat pan 612. In some embodiments, the retractable cushion 616 may be a telescoping design, accordion design, etc. The fabric cover of retractable portion 616 may be stretchable or compressible.

Accordingly, in some embodiments, as seat backrest 610 may recline from the upright position to a substantially horizontal position flush with side cushion 414, as illustrated in FIGS. 6A-6D ((s) and (t) views). A pitch between seat rows may be limited or fixed. Thus, as seat backrest 610 reclines to the horizontal position and as shown in FIGS. 6B-6D ((s) and (t) views), retractable portion 616 of seat pan 612 may retract so as to accommodate the length of seat backrest 610 and the movement of seat backrest 610 to the horizontal position. When seat backrest 610 is in the horizontal position, the retractable portion 616 may be fully retracted. Once in the bed position, seat backrest 610, seat pan 612, and side cushion 614 may provide a bed surface. When returning to the upright position, retractable portion 616 may expand so as to extend a length of seat pan 612 when the passenger seat 610 is in the upright position.

While the embodiments disclosed above are discussed separately, it should be understood that some aspects of each embodiment may be combinable with aspects of another embodiment. For example, in some embodiments, a seat pan of a passenger seat may include a retractable portion and may be extend into a recess of the seat unit in front of the passenger seat. In some embodiments, the seat backrest may not form a portion of a bed surface and the seat pan may include a retractable portion. In some embodiments, the seat backrest may not form a portion of the bed surface and a seat pan or footrest may extend into a recess of the seat unit in front of the passenger seat.

Figure 7A:
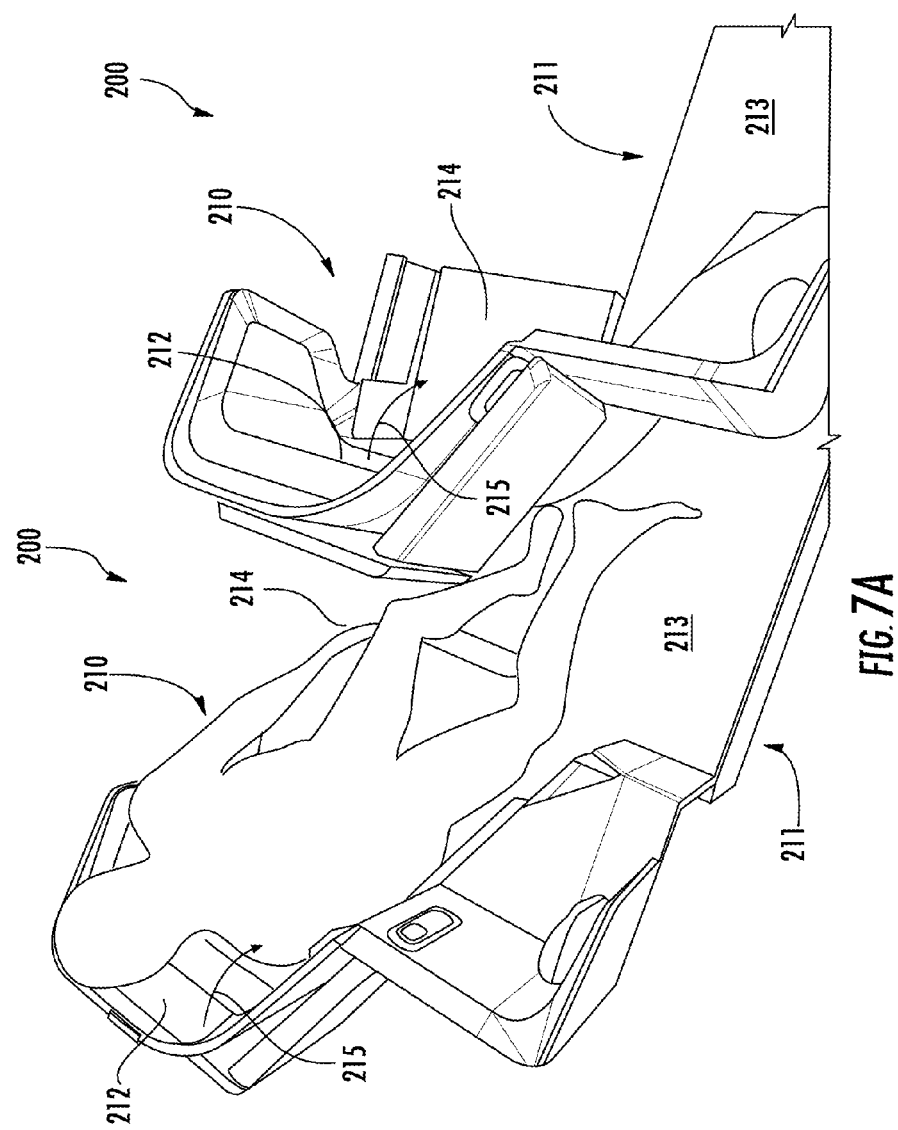
FIGS. 7A-7C illustrate exemplary embodiments of a seat unit that may provide a novel comfort position.
Figure 7B:
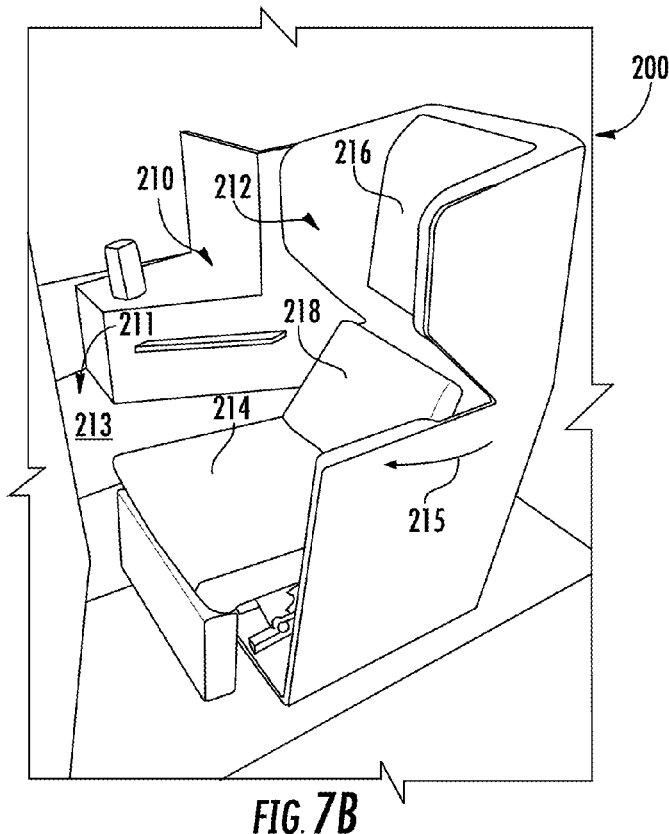
Figure 7C:
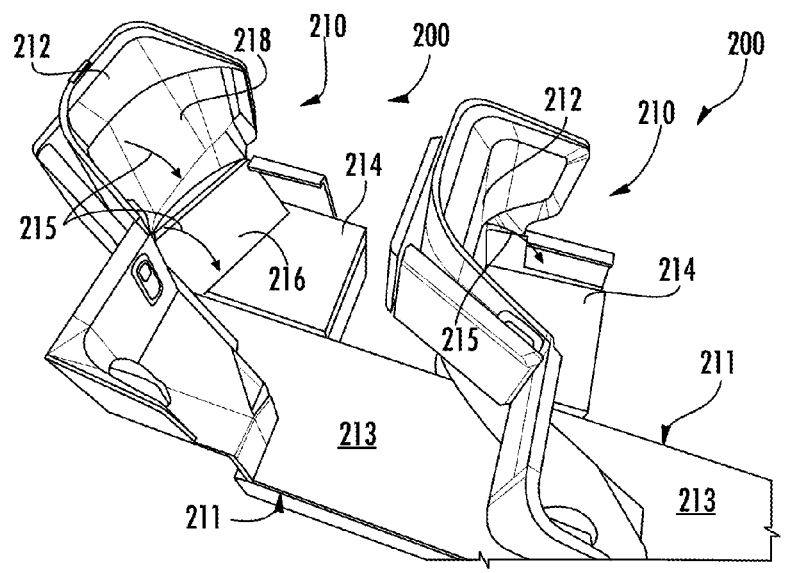

Optionally, in some embodiments, a seat unit may provide a novel comfort position as shown in FIGS. 7A-7C. Similar to the embodiments discussed above, seat units 200 may include a passenger seat 210 and a side cushion 211. Side cushion 211 may provide a substantially horizontal resting surface 213 adjacent to and extending forward from passenger seat 210. Passenger seat 210 may include a seat backrest 212 and a seat pan 214. The seat backrest 212 may be reclineable relative seat pan 214. The configuration of seat unit 200/passenger seat 210 in FIGS. 7A-7C may define a "lounge" position in which the seat backrest 212 is rotated in the direction 215 toward the side cushion 211. In such a position, passenger seat 210 may comfortably position a seated passenger such that the passenger may easily rest one or both legs on side cushion 213 without having to convert seat unit 200 to a bed position. Accordingly, seat backrest 212 may be rotatable on multiple axes to offer maximum comfort to the passenger.

In some embodiments, the backrest 212 may also be in more than one portion. For example, FIG. 7B shows an embodiment where seatback rest 212 may comprise an upper backrest 216 and a lower backrest 218. In some embodiments, seat unit 200 may be in the lounge position when the lower backrest 218 rotates in direction 215 toward side cushion 211. Optionally, as shown in FIG. 7C, upper backrest 216 and lower backrest 218 may rotate together in direction 215 to convert seat unit 200/passenger seat 210 into the lounge position. In some embodiments, the lower backrest 218 may be coupled with the seat pan 214 while seat backrest 216 couples with the privacy shell 220. It should be understood that some seat unit embodiments may provide the lounge position in addition to the bed position described above.

While seat units 10, 100, 200, 400, 600 or passenger seats 110, 210, 402, 602 may be used in passenger aircraft, it should be understood that these embodiments may be used in any vehicle. For example, the advantages of such embodiments may be desired in automobiles or trains.

Figure 8:
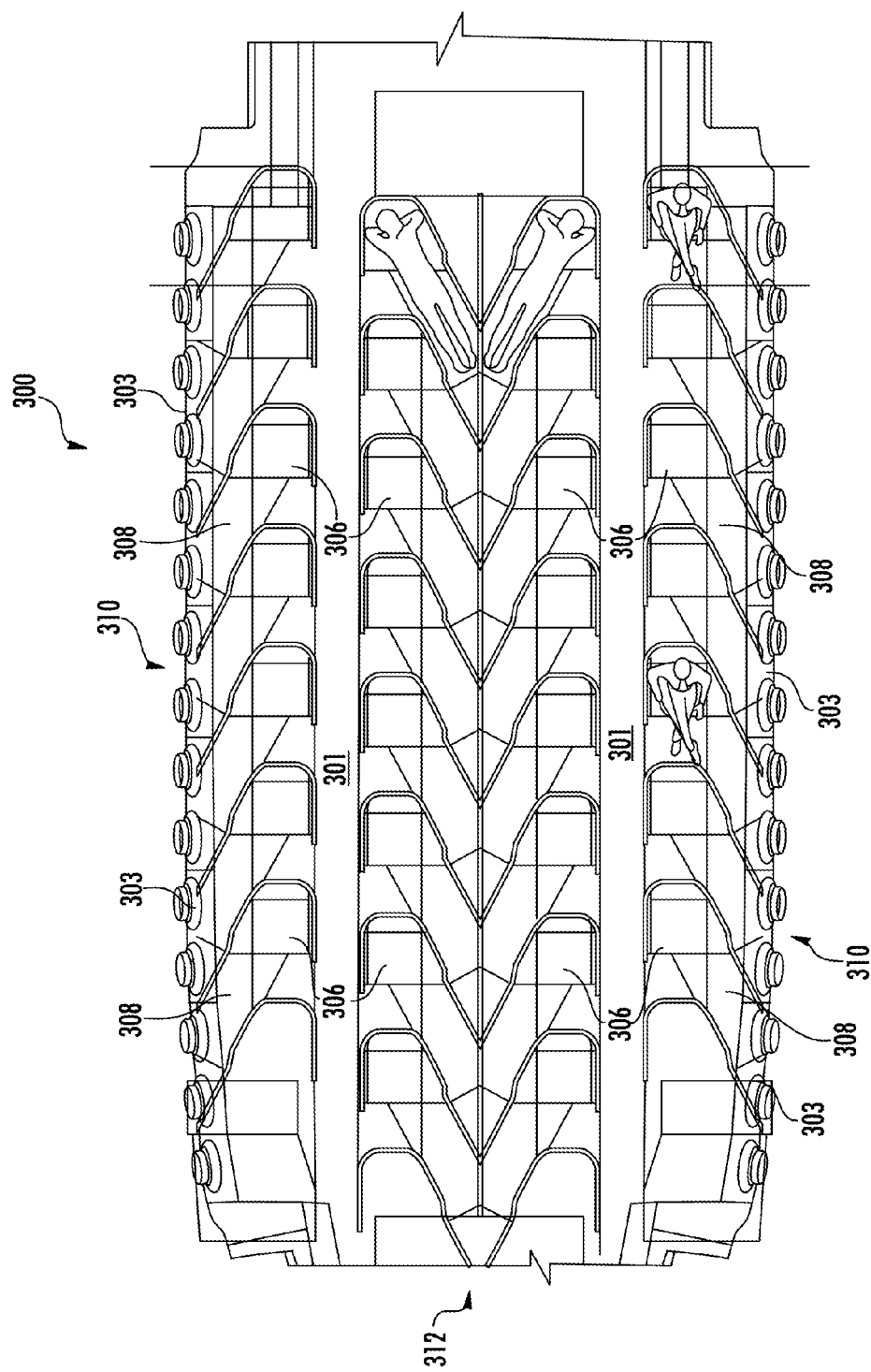
FIG. 8 illustrates an exemplary cabin arrangement of the seat units according to some embodiments of the present invention.

In some embodiments of the invention, a cabin arrangement is provided. FIG. 8 illustrates an exemplary cabin arrangement 300 of the seat units 10, 100, 200 according to some embodiments of the present invention. When in a bed position or lounge position, the seat unit arrangement 300 provides a forward facing seat with a reverse herringbone bed/lounge. The cabin arrangement 300 includes three columns of seat units separated by aisles 301. The three columns of seat units include two side columns 310 and an inner column 312. Each row in the side columns 310 include a single seat unit 306 and each row in the inner column 312 includes two seat units 306. The seat units in the side columns 310 are arranged so that the side cushion 308 of each seat unit 306 is positioned closer to the adjoining cabin wall 303 and forward of the passenger seat. The seat units 306 in the inner column 312 are positioned so that the side cushion 308 of each seat unit 306 is positioned medially with respect to inner column 312 and forward of the passenger seat. In such a configuration, passengers may easily enter and exit each of the seat units 306 to the aisles 301.

While cabin arrangement 300 is illustrated as providing forward facing seat units 306, it should be understood that cabin arrangement 300 may also provide for a backward facing seat unit 306 arrangement. Further some narrow cabins may be limited to two side columns 310 and possibly only a single side column 310. Wider cabins may include more than one inner column 312. In some embodiments, two, three, four, or more inner columns 312 may be provided. In alternative embodiments, inner columns 312 may only have a single seat unit 306 in each row. In such an embodiment, it may be preferable to arrange the seat units 306 such that the side cushions 308 are positioned on the same side of the column 312 so as to save space and/or accommodate additional seat units 306.

Further, while it may be preferable that all seat units 306 provide the bed position and lounge position, it should be understood that not all units 306 must provide each position. In some embodiments, the seat units 306 may provide a bed position, but not a lounge position. In other embodiments, the seat units 306 may provide a lounge position but not a bed position. In further embodiments, only some units 306 provide the bed position and only some units 306 provide the lounge position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An aircraft passenger seat arrangement comprising:
   a passenger seat that provides a plurality of different positions, the plurality of different positions including a bed position and an upright position, the bed position providing a bed surface being formed at least by a seat pan and one or more bed extensions;
   wherein the one or more bed extensions do not form part of a seat surface or a footrest surface when the passenger seat is in the upright position;
   wherein the one or more bed extensions are stored under the seat pan;
   wherein an upper surface of the one or more bed extensions is substantially parallel to an upper surface of the seat pan when the passenger seat is in the upright position;
   wherein the upper surface of the one or more bed extensions forms part of the bed surface when the passenger seat is in the bed position;
   wherein the passenger seat further comprises a footrest and a seat mechanism for deploying the footrest and the one or more bed extensions in order to convert the passenger seat to the bed position; and
   wherein the one or more bed extensions are located between the seat pan and the footrest when the passenger seat is in the bed position.

2. The Aircraft passenger seat arrangement of claim 1, wherein the passenger seat comprises a seat backrest; and wherein the seat backrest does not form part of the bed surface when the passenger seat is in the bed position.

3. The Aircraft passenger seat arrangement of claim 1, wherein the passenger seat comprises a seat backrest; and wherein a bottom portion of the seat backrest comprises a headrest cushion, the headrest cushion moveable to a deployed position to provide a headrest when the passenger seat is in the bed position and moveable to a stowed position when the passenger seat is in another position.

4. The Aircraft passenger seat arrangement of claim 1, further comprising a side cushion positioned laterally and forward of the passenger seat.

5. The Aircraft passenger seat arrangement of claim 4, wherein a passenger seat backrest is rotatable towards the side cushion so as to provide a lounge position.

6. The Aircraft passenger seat arrangement of claim 4, wherein the bed surface comprises the seat pan, the one or more bed extensions, and the side cushion.

7. The Aircraft passenger seat arrangement of any of claim 1, further comprising a sensor for detecting the presence of a passenger to avoid conversion of the seat from the bed position to the upright position when a passenger is not seated.

8. The Aircraft passenger seat arrangement of claim 1, further comprising a plurality of passenger seats oriented substantially in an axis of a cabin, the seats arranged such that the seats have a herringbone bed arrangement.

* * * * *